US009084204B2

(12) United States Patent
Lu

(10) Patent No.: US 9,084,204 B2
(45) Date of Patent: Jul. 14, 2015

(54) METHOD AND DEVICE FOR CONTROLLING UPLINK POWER

(75) Inventor: Chenhong Lu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 412 days.

(21) Appl. No.: 13/698,721

(22) PCT Filed: Nov. 5, 2010

(86) PCT No.: PCT/CN2010/078466
§ 371 (c)(1),
(2), (4) Date: Nov. 19, 2012

(87) PCT Pub. No.: WO2011/150628
PCT Pub. Date: Dec. 8, 2011

(65) Prior Publication Data
US 2013/0065631 A1 Mar. 14, 2013

(30) Foreign Application Priority Data
Jun. 4, 2010 (CN) .......................... 2010 1 0194448

(51) Int. Cl.
*H04B 7/00* (2006.01)
*H04W 52/24* (2009.01)
(Continued)

(52) U.S. Cl.
CPC .......... *H04W 52/242* (2013.01); *H04W 52/262* (2013.01); *H04W 52/146* (2013.01); *Y02B 60/50* (2013.01)

(58) Field of Classification Search
CPC ............ H04W 52/146; H04W 52/242; H04W 52/262

USPC .................................... 455/69, 522; 370/318
See application file for complete search history.

(56) References Cited

U.S. PATENT DOCUMENTS

2007/0265026 A1    11/2007    You et al.

FOREIGN PATENT DOCUMENTS

| CN | 1808936 A | 7/2006 |
| CN | 101141157 A | 3/2008 |

(Continued)

OTHER PUBLICATIONS

International Search Report for PCT/CN2010/078466 dated Feb. 18, 2011.

(Continued)

*Primary Examiner* — Raymond Dean
(74) *Attorney, Agent, or Firm* — Ling Wu; Stephen Yang; Ling and Yang Intellectual Property

(57) ABSTRACT

A method for controlling uplink power is disclosed in the present invention. The method includes: a base station configuring and sending a target received power parameter corresponding to a standard service rate, a path loss compensation factor parameter and a enabled deltaMCS parameter of adjusting transmitted power according to a Modulation Coding Scheme (MCS) grade to a terminal; subtracting target received power and a path loss compensation quantity from a limit value of the transmitted power of terminal to obtain power margin, and determining an available MCS grade of the terminal according to the power margin and sending the available MCS grade to the terminal. A system for controlling the uplink power is also disclosed in the present invention. In the present invention, a structure of the system is simple, which supports an adaptive selection for the suitable MCS grade of UE, and implements uplink power control correctly and effectively.

19 Claims, 1 Drawing Sheet

(51) Int. Cl.
*H04W 52/26* (2009.01)
*H04W 52/14* (2009.01)

(56) References Cited

FOREIGN PATENT DOCUMENTS

| CN | 101340711 A | 1/2009 |
|---|---|---|
| JP | 2004056210 A | 2/2004 |
| JP | 2009201106 A | 9/2009 |
| JP | 2010010969 A | 1/2010 |
| JP | 2010011464 A | 1/2010 |
| WO | 2007091676 A1 | 8/2007 |
| WO | WO 2007091676 A1 * | 8/2007 |
| WO | 2008109162 A2 | 9/2008 |

OTHER PUBLICATIONS

"Evolved Universal Terrestrial Radio Access"; 3rd Generation Partnership Project; Technical Specification Group Radio Access Network; Physical layer procedures, Release 9; 3GPP TS 36.213 V9.1.0, Mar. 2010; see pp. 2-13/E.

* cited by examiner

METHOD AND DEVICE FOR CONTROLLING UPLINK POWER

TECHNICAL FIELD

The present invention relates to the field of communication technology, and particularly, to a method and system for controlling uplink power.

BACKGROUND OF THE RELATED ART

Power control is one of key technologies for a communication system implementing resource allocation and interference management. In the mobile communication system, uplink power control is also called as reverse link power control, and in the premise of meeting the communication quality requirements of users, an effective uplink power control method can decrease the transmitted power of a user terminal, reduce interference between User Equipments (UE), extend stand-by time of the terminal, and increase capacity of the communication system.

Most of the existing uplink power control technologies imitate an early uplink power control method of a Time Division Synchronous Code Division Multiple Access (TD-SCDMA) system, and according to a service type for access of the user, a base station sends the expected received power corresponding to one transmission rate of service type to the UE and maintains one target received signal to noise ratio by itself at the same time, and the UE adds the received expected received power to a path loss value to obtain the expected transmitted power, and uses the expected transmitted power to perform transmission. When transmission channel quality is changed, by performing statistics on the Block Error Rate (BLER) of receiving data of the UE within a period of time, the base station can adjust and maintain the target received signal to noise ratio and generate a corresponding TPC command TPC command to be sent to the UE, thereby controlling the transmitted power of the UE.

However, in a High Speed Downlink Packet Access (HS-DPA) technology of the TD-SCDMA system, especially in a Long Term Evolution (LTE) system, a downlink packet service rate with higher rate is provided by introducing an Adaptive Modulation and Coding (AMC) technology, to enhance the spectrum utilization rate. Wherein, a core of the MAC is to implement an adaptive selection for a Modulation Coding Scheme (MCS) grade. Correspondingly, factors influencing the transmitted power of the UE are also increased. In an LTE protocol organized by the 3rd Generation Partnership Project (3GPP), it is defined that multiple parameters, such as target received power $P_{O\_PUSCH}$, path loss compensation factor, TPC command and "a parameter adjusting transmitted power according to the MCS grade" deltaMCS and so on, control the transmitted power of the UE. However, how the base station uses these parameters to control the uplink transmitted power of the terminal effectively is the problem required to be solved currently.

SUMMARY OF THE INVENTION

The technical problem solved by the present invention is to provide a method and system for controlling uplink power, which supports an adaptive selection for a suitable MCS grade of UE, and implements an effective control on uplink transmitted power of the UE.

In order to solve the above technical problem, the present invention provides a method for controlling uplink power, which comprises:

a base station configuring and sending a target received power parameter corresponding to a standard service rate, a path loss compensation factor parameter and an enabled deltaMCS parameter of adjusting transmitted power according to a Modulation Coding Scheme (MCS) grade to a terminal; subtracting target received power and a path loss compensation quantity from a limit value of the transmitted power of the terminal to obtain power margin, and determining an available MCS grade of the terminal according to the power margin and sending the available MCS grade to the terminal.

The method further comprises: after receiving the target received power parameter, the path loss compensation factor parameter, the enabled deltaMCS parameter and the MCS grade sent by the base station, the terminal adding the target received power, the path loss compensation quantity and the power margin determined according to the MCS grade to obtain expected transmitted power, and using the expected transmitted power to perform transmission.

When the base station determines the available MCS grade of the terminal according to the power margin, if the power margin is positive power margin, the determined MCS grade is greater than or equal to the standard service rate; and if the power margin is negative power margin, the determined MCS grade is less than or equal to the standard service rate.

The method further comprises: while configuring and sending the target received power parameter, the path loss compensation factor parameter and the enabled deltaMCS parameter to the terminal, the base station maintaining a standard service signal to interference plus noise ratio expected value;

when a transmission channel quality is changed, the base station adjusting the maintained the standard service signal to interference plus noise ratio expected value according to a counted block error rate of receiving data of the terminal within a preset time interval, calculating a power adjustment quantity and generating a corresponding TPC command to be sent to the terminal; meanwhile, adjusting current power margin according to the TPC command, and redetermining the available MCS grade of the terminal according to the adjusted power margin and sending the available MCS grade to the terminal.

The step of the base station adjusting the maintained the standard service signal to interference plus noise ratio expected value according to the block error rate comprises:

if the block error rate is greater than the sum of a block error rate threshold and a fluctuation up-threshold of the block error rate threshold, adding a preset up-regulation step length to the maintained standard service signal to interference plus noise ratio expected value;

if the block error rate is less than a difference between the block error rate threshold and a fluctuation down-threshold of the block error rate threshold, reducing a preset down-regulation step length from the maintained standard service signal to interference plus noise ratio expected value.

After adjusting the maintained the standard service signal to interference plus noise ratio expected value SINRtarget, the base station calculates the power adjustment quantity $P_{offset}$ and generates the corresponding TPC command in the following way:

according to an uplink service demodulation signal to interference plus noise ratio SINRm of the terminal obtained from measurement, calculating a standard service demodulation signal to interference plus noise ratio SINR according to the following formula: SINR=SINRm−ΔTF; calculating the power adjustment quantity $P_{offset}$ according to the following formula: $P_{offset}$=SINR−SINRtarget;

and generating the corresponding TPC command according to the calculated power adjustment quantity $P_{offset}$;

wherein, ΔTF is the power margin determined according to the MCS grade of an uplink service of the terminal.

The step of the base station adjusting current power margin according to the TPC command comprises:

after subtracting the TPC command from the current power margin, taking the subtracted power margin as the adjusted power margin.

The present invention further provides a system for controlling uplink power, which comprises: a parameter configuration module of a Radio Resource Control (RRC) layer of a base station and an uplink inner-loop power control module of a Medium Access Control (MAC) layer of the base station, wherein:

the parameter configuration module is configured to: configure a target received power parameter corresponding to a standard service rate, a path loss compensation factor parameter and an enabled deltaMCS parameter of adjusting transmitted power according to a Modulation Coding Scheme (MCS) grade for a terminal, and send the target received power parameter, the path loss compensation factor parameter and the enabled deltaMCS parameter to the uplink inner-loop power control module;

the uplink inner-loop power control module is configured to: subtract the sum of target received power and a path loss compensation quantity from a limit value of the transmitted power of the terminal to obtain power margin, and determine an available MCS grade of the terminal according to the power margin and send the available MCS grade to the terminal.

The system further comprises an uplink transmission module of the terminal, wherein, the uplink transmission module is configured to: after receiving the target received power parameter, the path loss compensation factor parameter, the enabled deltaMCS parameter and the MCS grade sent by the base station, add the target received power, the path loss compensation quantity and the power margin determined according to the MCS grade to obtain expected transmitted power, and use the expected transmitted power to perform transmission.

The system further comprises an uplink service demodulation module and a demodulation signal to interference plus noise ratio measurement module of a physical layer of the base station, and an uplink outer-loop power control module of the MAC layer of the base station, wherein:

the uplink service demodulation module is configured to: receive uplink service data of the terminal, and demodulate and report a cyclic redundancy check indicator corresponding to each transmission block;

the demodulation signal to interference plus noise ratio measurement module is configured to: measure and report an uplink service demodulation signal to interference plus noise ratio of the terminal;

the uplink outer-loop power control module is configured to: according to the received configuration parameters sent by the parameter configuration module and the cyclic redundancy check indicator corresponding to each transmission block of the terminal, perform statistics on a block error rate of receiving data of the terminal within a preset time interval, adjust a maintained standard service signal to interference plus noise ratio expected value, and send the adjusted standard service signal to interference plus noise ratio expected value to the uplink inner-loop power control module; and the uplink inner-loop power control module is further configured to: according to the received uplink service demodulation signal to interference plus noise ratio of the terminal reported by the demodulation signal to interference plus noise ratio measurement module, calculate a standard service demodulation signal to interference plus noise ratio, and according to a difference value between the standard service demodulation signal to interference plus noise ratio and the received standard service signal to interference plus noise ratio expected value sent by the uplink outer-loop power control module, calculate a power adjustment quantity and generate a corresponding TPC command to be sent to the terminal; meanwhile, adjust current power margin according to the TPC command, and redetermine the available MCS grade of the terminal according to the adjusted power margin and send the available MCS grade to the terminal.

The present invention provides a method for implementing LTE uplink power control, and in the method, an enable function of deltaMCS is used to divide the transmitted power of the terminal into two parts: the transmitted power needed for a standard service and the power margin, and the adjustment of the transmitted power needed for the standard service due to the change of channel is maintained through the TPC command, and meanwhile, the power margin is used to implement AMC, thereby implementing effective uplink power control which supports the AMC transmission. In addition, the present invention provides a system for implementing the LTE uplink power control, and a structure of the system is simple, which supports the adaptive selection for the suitable MCS grade of the UE, and implements the uplink power control correctly and effectively.

PREFERRED EMBODIMENTS OF THE PRESENT INVENTION

Figure 1:
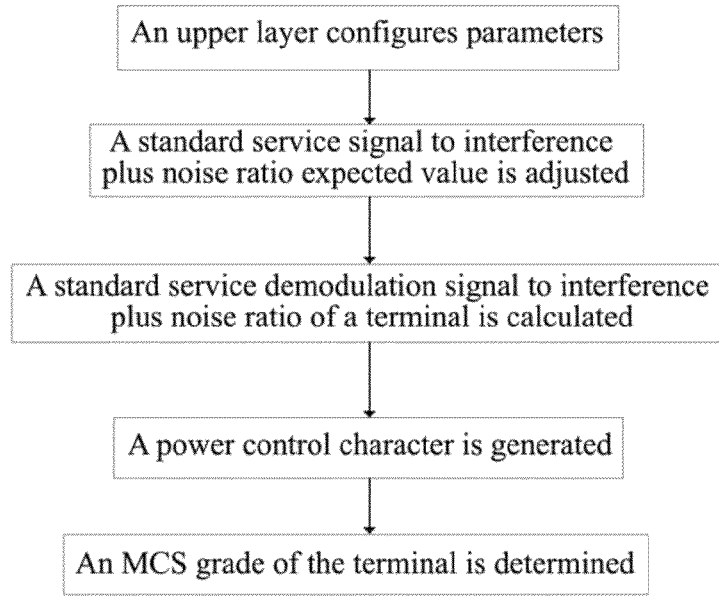
FIG. 1 is a flow diagram of steps of a method for controlling uplink power according to the example of the present invention.

The core idea of the present invention is to use an enable function of a deltaMCS parameter to divide transmitted power of a terminal into two parts: transmitted power needed for a standard service and power margin, implement the adjustment of the transmitted power needed for the standard service due to the change of channel through a TPC command, and use the power margin to implement Adaptive Modulation and Coding (AMC).

Based on the above idea, the present invention provides a method for implementing uplink power control, and the following technical scheme is specifically used.

A base station configures and sends a target received power parameter corresponding to a standard service rate, a path loss compensation factor parameter and an enabled deltaMCS parameter to a UE, and it subtracts target received power and a path loss compensation quantity from a limit value of transmitted power of the UE to obtain power margin, and determines an available Modulation Coding Scheme (MCS) grade of the UE according to the power margin and sends the available MCS grade to the UE.

Consequently, the UE can add the target received power, the path loss compensation quantity and the power margin determined according to the MCS grade to obtain expected transmitted power according to parameters configured by the base station, and use the expected transmitted power to perform transmission.

Wherein, for the processing after a terminal receives these configuration parameters sent by the base station, that is, how to calculate the transmitted power according to these parameters, the existing protocol has an explicit definition.

Wherein, when the available MCS grade of the UE is determined according to the power margin, if the power margin is positive power margin, the determined MCS grade is greater than or equal to the standard service rate; and if the power margin is negative power margin, the determined MCS grade is less than or equal to the standard service rate. The specific determining method can refer to a 3GPP36.213 protocol, and each MCS grade corresponds to one service rate respectively.

Moreover, while configuring the parameters for UE, the base station maintains one standard service signal to interference plus noise ratio expected value;

when the transmission channel quality is changed, the base station adjusts the maintained the standard service signal to interference plus noise ratio expected value by performing statistics on block error rate information of receiving data of the UE within a preset time interval, and calculates a power adjustment quantity and generates a corresponding TPC command to be sent to the UE; meanwhile, according to the power margin obtained by subtracting the sum of the target received power, the path loss compensation quantity of the UE and the TPC command from the limit value of the transmitted power of the UE, it redetermines the available MCS grade of the UE and sends the available MCS grade to the UE, thereby controlling uplink transmitted power of the UE on the basis of supporting the AMC technology.

Furthermore, the above method can include the following steps specifically.

In step 1, an upper layer configures parameters.

A Radio Resource Control (RRC) layer of the base station configures the target received power parameter, the path loss compensation factor parameter and the enabled deltaMCS for each accessed UE, and sends these configuration parameters to a Medium Access Control (MAC) layer of the base station. In addition, the RRC layer of the base station will also configure the standard service signal to interference plus noise ratio expected value of each UE for the MAC layer.

In step 2, the standard service signal to interference plus noise ratio expected value is adjusted.

According to the received configuration parameters, the MAC layer of the base station performs measurement statistics (the statistics is performed every other certain cycles) of uplink outer-loop power control locally according to a cyclic redundancy check indicator corresponding to each transmission block from the terminal reported by a physical layer, and obtains the adjusted standard service signal to interference plus noise ratio expected value SINRtarget of each UE.

In step 3, a standard service demodulation signal to interference plus noise ratio of the terminal is obtained.

The MAC layer of the base station locally subtracts the transmitted power margin of uplink service and standard service of the terminal from the demodulated signal to interference plus noise ratio of an uplink service channel of the terminal measured by the physical layer to obtain the standard service demodulation signal to interference plus noise ratio SINR of the terminal.

In step 4, the TPC command is generated.

The MAC layer of the base station compares the standard service demodulation signal to interference plus noise ratio of each terminal with the adjusted signal to interference plus noise ratio expected value of each terminal, and if the SINR of the terminal is greater than the SINRtarget, the base station sends one TPC command reducing the transmitted power to the UE; on the contrary, if the SINR of the terminal is less than the SINRtarget, the base station sends one power control character increasing the transmitted power to the UE; and if the SINR of the terminal is equal to the SINRtarget, the base station sends one TPC command 0 to the UE.

In step 5, the MCS grade of the terminal is determined.

The MAC layer of the base station calculates the current power margin of each terminal according to the received configuration parameters, the TPC command of each terminal and a limitation of the transmitted power of each terminal, thereby determines the available MCS grade of each terminal to be sent to the terminal.

The examples of the present invention will be described in detail in combination with the accompanying drawings below. It should be noted that the examples in the present invention and the characteristics in the examples can be combined with each other at random in the condition of no conflict.

As shown in FIG. 1, the method for controlling uplink power according to the example of the present invention can include the following main steps.

In step 1, an upper layer configures parameters.

An RRC layer of a base station configures and sends target received power parameter $P_{O\_PUSCH}$ a path loss compensation factor parameter and an enabled deltaMCS parameter to an accessed terminal, and sends these configuration parameters to an MAC layer of the base station. In the example, a Quadrature Phase Shift Keying (QPSK) service with a coding efficiency of 0.4 is defined as a standard service, and the target received power required by the standard service in a certain interference margin is $P_{O\_PUSCH}$. For example, if a value range of the interference margin is [5,10] dB, a value range of the corresponding target received power is [−120,−100] dB, and different base stations can adjust the parameter configurations within this range according to demodulation performances of receivers of the base stations. A path loss compensation factor α can take a value of [0,0.4,0.6,0.7,0.8,0.9,1] and a default value is 1. The deltaMCS parameter is set as enable, which indicates that a UE is required to adjust transmitted power according to an MCS grade.

In addition, the RRC layer of the base station also needs to configure a standard service signal to interference plus noise ratio expected value SINRtarget of each UE for the MAC layer. Each terminal is configured with the same value during the initial configuration, and the value can be determined according to the demodulation performance of a receiver of the base station. For example, the receiver can be selected to receive a received signal to interference plus noise ratio when a standard service demodulation Block Error Ratio (BLER) is equal to 10%.

In step 2, the standard service signal to interference plus noise ratio expected value is adjusted.

According to the received configuration parameters, the MAC layer of the base station performs measurement statistics of uplink outer-loop power control locally according to uplink data sent by the terminal, and obtains the adjusted standard service signal to interference plus noise ratio expected value SINRtarget of each UE. Wherein, the statistical measurement method used for adjusting the signal to interference plus noise ratio expected value can use the existing various statistical measurement methods for adjusting the signal to interference plus noise ratio expected value.

Using the BLER to adjust the SINRtarget for a certain terminal is taken as an example to specifically describe an implementation process thereof below, and the process includes the following steps.

In step A, the MAC layer of the base station performs statistics on the number of data Transmission Blocks (TBs) received from the terminal, judges correctness and error of the TBs according to the value of Cyclic Redundancy Check Indicator (CRCI) corresponding to each TB from the terminal reported by a physical layer, and performs statistics on error TBs.

For example, when the base station receives one TB transmitted from the terminal, 1 is added to the total number of transmission blocks Ntotal, whether the TB is correct is judged at the point, and if the CRCI=1 and it is indicated that the TB is incorrect, 1 is added to the number of error TBs Nerror.

In step B, after the Ntotal reaches to a preset measurement and statistics cycle, according to the counted number of the error TBs and the total number of transmission blocks, the current BLER is calculated, and it is judged whether the obtained BLER is greater than the sum of a block error rate threshold BLERth and a fluctuation up-threshold UP_th of the BLERth, that is, it is judged whether the current BLER>BLERth+UP_th? if the current BLER>BLERth+UP_th, the SINRtarget is increased according to a preset up-regulation step length, that is, SINRtarget=SINRtarget+up-regulation step length, afterwards, it is assumed that Ntotal=0 and Nerror=0; if not, it is further judged whether the obtained BLER is less than a difference between the block error rate threshold BLERth and a fluctuation down-threshold Dw_th of the BLERth, that is, it is judged whether the current BLER<BLERth−Dw_th? if the current BLER<BLERth−Dw_th, the SINRtarget is reduced according to a preset down-regulation step length, that is, SINRtarget=SINRtarget−down-regulation step length, afterwards, it is assumed that Ntotal=0 and Nerror=0; if not, the SINRtarget is not adjusted, and it is assumed that Ntotal=0 and Nerror=0.

In step 3, a standard service demodulation signal to interference plus noise ratio of the terminal is calculated.

The MAC layer of the base station subtracts the transmitted power margin $\Delta TF$ of uplink service and standard service of the terminal from the demodulated signal to interference plus noise ratio SINRm of an uplink service channel of the terminal measured by the physical layer to obtain the standard service demodulation signal to interference plus noise ratio SINR of the terminal, that is, SINR=SINRm−$\Delta TF$. Wherein, $\Delta TF$ is obtained from the calculation according to the MCS grade of the uplink service of the terminal, referring to the 3GPP36.213 protocol for the specific calculation formula.

Wherein, the demodulated signal to interference plus noise ratio SINRm of the uplink service channel of the terminal measured by the physical layer is initialized as SINRtarget, and $\Delta TF$ is initialized as 0, that is, when the terminal has not sent data services yet, SINRm=SINRtarget, and $\Delta TF$=0.

In step 4, a TPC command is generated.

The MAC layer of the base station compares the SINR of each terminal with the SINRtarget of each terminal, and calculates a power adjustment quantity $P_{offset}$, $P_{offset}$=SINR−SINRtarget, and if $P_{offset}$ is greater than 0, the base station sends one TPC command reducing the transmitted power to the UE; if $P_{offset}$ is less than 0, the base station sends one TPC command increasing the transmitted power to the UE; if $P_{offset}$ is equal to 0, the base station sends one TPC command 0 to the UE. Wherein, the power control character is the power adjustment quantity notified by the base station to the UE.

In step 5, the MCS grade of the received terminal is determined.

According to the received configuration parameters, the TPC command of each terminal and a limitation $PSD_{max}$ of the transmitted power of each terminal, the MAC layer of the base station calculates the current power margin $\Delta TF(i)$ of each terminal, $\Delta TF(i)=PSD_{max}-P_{0\_PUSCH}-\alpha \cdot PL-f(i)$, thereby determining an available MCS grade of each terminal to be sent to the terminal. Wherein, f(i) is an accumulation of power adjustment quantities sent by the base station at a corresponding moment.

Wherein, PL is a path loss value of the terminal, the limitation $PSD_{max}$ of the transmitted power of each terminal can be the maximum transmitted power of capability level limitation of each terminal, and also can be the maximum transmitted power calculated according to an interference limitation algorithm. The MCS grade of each terminal can be determined with reference to the 3GPP36.213 protocol according to the $\Delta TF(i)$.

The terminal calculates expected transmitted power P according to the parameters sent by the base station, the expected transmitted power $P=P_{O\_PUSCH}+\alpha \cdot PL+\Delta TF(i)+f(i)$, and initial expected transmitted power of the terminal is actually the $PSD_{max}$, thus the terminal will use the $PSD_{max}$ to perform uplink transmission.

It can be seen that, the power control algorithm provided by the present invention is mainly an algorithm of a base station side, and the terminal is only required to determine the transmitted power according to parameter information, such as a power control command word and the MCS grade sent by the base station and so on, in accordance with protocol regulations.

Figure 2:
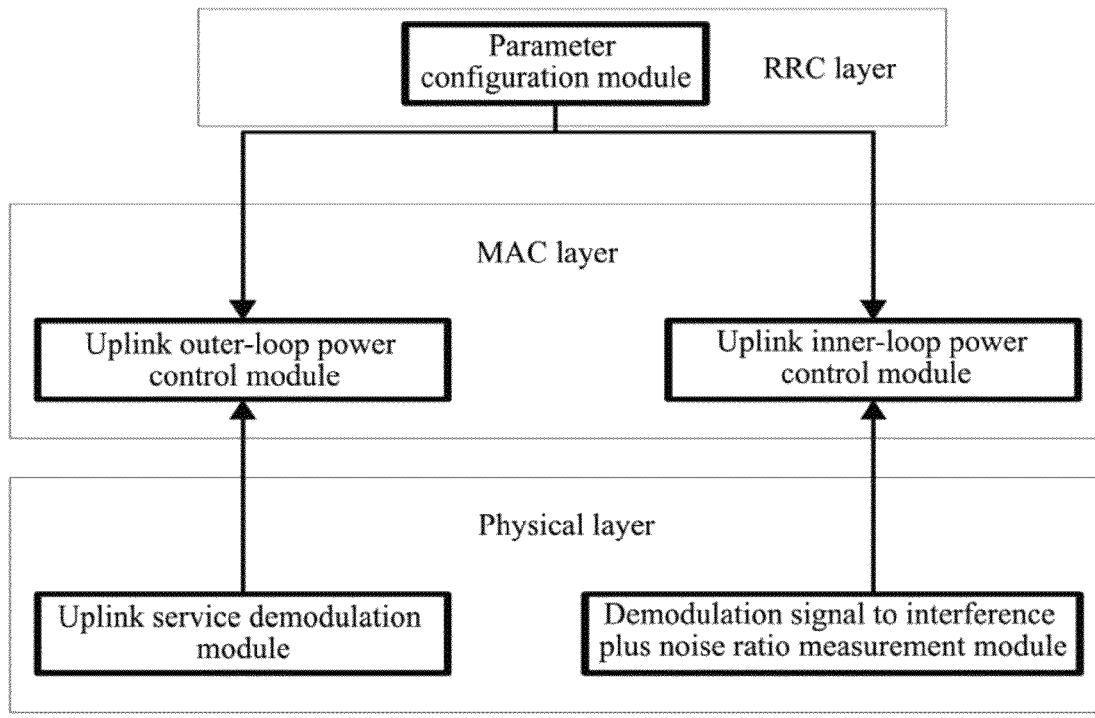
FIG. 2 is a schematic block diagram of a system for controlling uplink power according to the example of the present invention.

FIG. 2 is a schematic diagram of a system for controlling uplink power according to the example of the present invention. As shown in FIG. 2, the system is composed of an RRC layer, an MAC layer and a physical layer of a base station, wherein, the RRC layer includes a parameter configuration module, the physical layer includes an uplink service demodulation module of a terminal and a demodulation signal to interference plus noise ratio measurement module, and the MAC layer includes an uplink outer-loop power control module and an uplink inner-loop power control module.

Wherein, the parameter configuration module is configured to: configure parameters such as a target received power parameter $P_{O\_PUSCH}$, a path loss compensation factor parameter and an enabled deltaMCS for the terminal, and send the configuration parameters to the MAC layer of the base station;

the uplink inner-loop power control module is configured to: determine a suitable MCS grade of the terminal according to the received configuration parameters of the RRC layer and a limitation of transmitted power of each terminal, and send the MCS grade to the terminal.

Furthermore, the parameter configuration module is further configured to: send each configuration parameter to the uplink inner-loop power control module and the uplink outer-loop power control module of the MAC layer;

the uplink service demodulation module is configured to: receive uplink service data of the terminal, and demodulate and report a cyclic redundancy check indicator corresponding to each transmission block;

the demodulation signal to interference plus noise ratio measurement module is configured to: measure and report an uplink service demodulation signal to interference plus noise ratio of each terminal;

the uplink outer-loop power control module is configured to: when a channel is changed, according to the received configuration parameters of the RRC layer and the cyclic redundancy check indicator corresponding to each transmission block of the terminal reported by the demodulation module of the physical layer, perform statistics on the block error rate of receiving data of the terminal within a preset time interval, adjust a maintained standard service signal to interference plus noise ratio expected value, send the adjusted standard service signal to interference plus noise ratio expected value to the uplink inner-loop power control module, and perform inner-loop power control on each UE;

the uplink inner-loop power control module is further configured to: according to the received uplink service demodulation signal to interference plus noise ratio of the terminal reported by the demodulation signal to interference plus noise ratio measurement module, calculate a standard service demodulation signal to interference plus noise ratio, and according to a difference value between the standard service demodulation signal to interference plus noise ratio and the received standard service signal to interference plus noise ratio expected value sent by the uplink outer-loop power control module, calculate a power adjustment quantity, and generate a corresponding TPC command, then determine the suitable MCS grade of the terminal according to the received configuration parameters and the limitation of transmitted power of each terminal and send the MCS grade to the terminal.

In addition, the system also include an uplink transmission module (not shown in the figure) of a terminal side, and the uplink transmission module is configured to: after receiving the target received power parameter, the path loss compensation factor parameter, the enabled deltaMCS parameter and the MCS grade sent by the base station, add target received power, a path loss compensation quantity and power margin determined according to the MCS grade to obtain expected transmitted power, and use the expected transmitted power to perform transmission.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present invention is not limited to any combination of hardware and software in a specific form.

The above description is only the preferred examples of the present invention, which is not used to limit the present invention. The present invention can have various modifications and changes for the people skilled in the art. All the modifications, equivalent substitutions, and improvements and so on made within the spirit and principle of the present invention fall into the protection scope of the present invention.

INDUSTRIAL APPLICABILITY

The present invention provides a method for implementing LTE uplink power control, and in the method, deltaMCS is used to divide the transmitted power of the terminal into two parts: the transmitted power needed for a standard service and the power margin, and the adjustment of the transmitted power needed for the standard service due to the change of channel is maintained through the TPC command, and meanwhile, the power margin is used to implement AMC, thereby implementing effective uplink power control which supports the AMC transmission. In addition, the present invention provides a system for implementing the LTE uplink power control, and a structure of the system is simple, which supports the adaptive selection for the suitable MCS grade of the UE, and implements the uplink power control correctly and effectively.

What is claimed is:

1. A method for controlling uplink power, comprising:
a base station configuring and sending a target received power parameter corresponding to a standard service rate, a path loss compensation factor parameter and an enabled deltaMCS parameter of adjusting transmitted power according to a Modulation Coding Scheme (MCS) grade to a terminal; sending the target received power parameter, the path loss compensation factor parameter and the enabled deltaMCS parameter to the terminal; subtracting target received power and a path loss compensation quantity from a limit value of the transmitted power of the terminal to obtain power margin, and determining an available MCS grade of the terminal according to the power margin and sending the available MCS grade to the terminal.

2. The method according to claim 1, further comprising:
after receiving the target received power parameter, the path loss compensation factor parameter, the enabled deltaMCS parameter and the MCS grade sent by the base station, the terminal adding the target received power, the path loss compensation quantity and the power margin determined according to the MCS grade to obtain expected transmitted power, and using the expected transmitted power to perform transmission.

3. The method according to claim 1, wherein,
when the base station determines the available MCS grade of the terminal according to the power margin, if the power margin is positive power margin, the determined MCS grade is greater than or equal to the standard service rate; and if the power margin is negative power margin, the determined MCS grade is less than or equal to the standard service rate.

4. The method according to claim 1, further comprising:
while configuring and sending the target received power parameter, the path loss compensation factor parameter and the enabled deltaMCS parameter to the terminal, the base station maintaining a standard service signal to interference plus noise ratio expected value;
when a transmission channel quality is changed, the base station adjusting the maintained standard service signal to interference plus noise ratio expected value according to a counted block error rate of receiving data of the terminal within a preset time interval, calculating a power adjustment quantity and generating a corresponding TPC command to be sent to the terminal; meanwhile, adjusting current power margin according to the TPC command, and redetermining the available MCS grade of the terminal according to the adjusted power margin and sending the available MCS grade to the terminal.

5. The method according to claim 4, wherein,
the step of the base station adjusting maintained the standard service signal to interference plus noise ratio expected value according to the block error rate comprises:
if the block error rate is greater than the sum of a block error rate threshold and a fluctuation up-threshold of the block error rate threshold, adding a preset up-regulation step length to the maintained standard service signal to interference plus noise ratio expected value;
if the block error rate is less than a difference between the block error rate threshold and a fluctuation down-threshold of the block error rate threshold, reducing a preset down-regulation step length from the maintained standard service signal to interference plus noise ratio expected value.

6. The method according to claim 5, wherein,
after adjusting maintained the standard service signal to interference plus noise ratio expected value SINRtarget, the base station calculates the power adjustment quantity $P_{offset}$ and generates the corresponding TPC command in a following way:
according to an uplink service demodulation signal to interference plus noise ratio SINRm of the terminal obtained from measurement, calculating a standard service demodulation signal to interference plus noise ratio SINR according to a following formula: SINR=SINRm−ΔTF;
calculating the power adjustment quantity $P_{offset}$ according to a following formula: $P_{offset}$=SINR−SINRtarget;
and generating the corresponding TPC command according to the calculated power adjustment quantity $P_{offset}$;
wherein, ΔTF is the power margin determined according to the MCS grade of an uplink service of the terminal.

7. The method according to claim 4, wherein,
the step of the base station adjusting current power margin according to the TPC command comprises:
after subtracting the power control character from the current power margin, taking the subtracted power margin as the adjusted power margin.

8. A system for controlling uplink power, comprising: a parameter configuration module of a Radio Resource Control (RRC) layer of a base station and an uplink inner-loop power control module of a Medium Access Control (MAC) layer of the base station, wherein:
the parameter configuration module is configured to: configure a target received power parameter corresponding to a standard service rate, a path loss compensation factor parameter and an enabled deltaMCS parameter of adjusting transmitted power according to a Modulation Coding Scheme (MCS) grade for a terminal, and send the target received power parameter, the path loss compensation factor parameter and the enabled deltaMCS parameter to the uplink inner-loop power control module;
the uplink inner-loop power control module is configured to: subtract the sum of target received power and a path loss compensation quantity from a limit value of the transmitted power of the terminal to obtain power margin, and determine an available MCS grade of the terminal according to the power margin and send the available MCS grade to the terminal.

9. The system according to claim 8, further comprising: an uplink transmission module of the terminal, wherein,
the uplink transmission module is configured to: after receiving the target received power parameter, the path loss compensation factor parameter, the enabled deltaMCS parameter and the MCS grade sent by the base station, add the target received power, the path loss compensation quantity and the power margin determined according to the MCS grade to obtain expected transmitted power, and use the expected transmitted power to perform transmission.

10. The system according to claim 8, further comprising: an uplink service demodulation module and a demodulation signal to interference plus noise ratio measurement module of a physical layer of the base station, and an uplink outer-loop power control module of the MAC layer of the base station, wherein:
the uplink service demodulation module is configured to: receive uplink service data of the terminal, and demodulate and report a cyclic redundancy check indicator corresponding to each transmission block;
the demodulation signal to interference plus noise ratio measurement module is configured to: measure and report an uplink service demodulation signal to interference plus noise ratio of the terminal;
the uplink outer-loop power control module is configured to: according to received configuration parameters sent by the parameter configuration module and the cyclic redundancy check indicator corresponding to each transmission block of the terminal, perform statistics on a block error rate of receiving data of the terminal within a preset time interval, adjust a maintained standard service signal to interference plus noise ratio expected value, and send the adjusted standard service signal to interference plus noise ratio expected value to the uplink inner-loop power control module;
the uplink inner-loop power control module is further configured to: according to the received uplink service demodulation signal to interference plus noise ratio of the terminal reported by the demodulation signal to interference plus noise ratio measurement module, calculate a standard service demodulation signal to interference plus noise ratio, and according to a difference value between the standard service demodulation signal to interference plus noise ratio and the received standard service signal to interference plus noise ratio expected value sent by the uplink outer-loop power control module, calculate a power adjustment quantity and generate a corresponding TPC command to be sent to the terminal; meanwhile, adjust current power margin according to the TPC command, and redetermine the available MCS grade of the terminal according to the adjusted power margin and send the available MCS grade to the terminal.

11. The method according to claim 2, further comprising:
while configuring and sending the target received power parameter, the path loss compensation factor parameter and the enabled deltaMCS parameter to the terminal, the base station maintaining a standard service signal to interference plus noise ratio expected value;
when a transmission channel quality is changed, the base station adjusting standard service signal to interference plus noise ratio expected value according to a counted block error rate of receiving data of the terminal within a preset time interval, calculating a power adjustment quantity and generating a corresponding TPC command to be sent to the terminal; meanwhile, adjusting current power margin according to the TPC command, and redetermining the available MCS grade of the terminal according to the adjusted power margin and sending the available MCS grade to the terminal.

12. The method according to claim 3, further comprising:
while configuring and sending the target received power parameter, the path loss compensation factor parameter and the enabled deltaMCS parameter to the terminal, the base station maintaining a standard service signal to interference plus noise ratio expected value;
when a transmission channel quality is changed, the base station adjusting and maintaining the standard service signal to interference plus noise ratio expected value according to a counted block error rate of receiving data of the terminal within a preset time interval, calculating a power adjustment quantity and generating a corresponding TPC command to be sent to the terminal; meanwhile, adjusting current power margin according to the TPC command, and redetermining the available MCS grade of the terminal according to the adjusted power margin and sending the available MCS grade to the terminal.

13. The method according to claim 11, wherein,
the step of the base station adjusting the maintained standard service signal to interference plus noise ratio expected value according to the block error rate comprises:
if the block error rate is greater than the sum of a block error rate threshold and a fluctuation up-threshold of the block error rate threshold, adding a preset up-regulation step length to the maintained standard service signal to interference plus noise ratio expected value;
if the block error rate is less than a difference between the block error rate threshold and a fluctuation down-threshold of the block error rate threshold, reducing a preset down-regulation step length from the maintained standard service signal to interference plus noise ratio expected value.

14. The method according to claim 12, wherein,
the step of the base station adjusting the maintained standard service signal to interference plus noise ratio expected value according to the block error rate comprises:
if the block error rate is greater than the sum of a block error rate threshold and a fluctuation up-threshold of the block error rate threshold, adding a preset up-regulation step length to the maintained standard service signal to interference plus noise ratio expected value;
if the block error rate is less than a difference between the block error rate threshold and a fluctuation down-threshold of the block error rate threshold, reducing a preset down-regulation step length from the maintained standard service signal to interference plus noise ratio expected value.

15. The method according to claim 13, wherein,
after adjusting the maintained the standard service signal to interference plus noise ratio expected value SINRtarget, the base station calculates the power adjustment quantity $P_{offset}$ and generates the corresponding TPC command in a following way:
according to an uplink service demodulation signal to interference plus noise ratio SINRm of the terminal obtained from measurement, calculating a standard service demodulation signal to interference plus noise ratio SINR according to a following formula: SINR=SINRm−ΔTF;
calculating the power adjustment quantity $P_{offset}$ according to a following formula: $P_{offset}$=SINR−SINRtarget;
and generating the corresponding TPC command according to the calculated power adjustment quantity $P_{offset}$;
wherein, ΔTF is the power margin determined according to the MCS grade of an uplink service of the terminal.

16. The method according to claim 14, wherein,
after adjusting the maintained the standard service signal to interference plus noise ratio expected value SINRtarget, the base station calculates the power adjustment quantity $P_{offset}$ and generates the corresponding TPC command in a following way:
according to an uplink service demodulation signal to interference plus noise ratio SINRm of the terminal obtained from measurement, calculating a standard service demodulation signal to interference plus noise ratio SINR according to a following formula: SINR=SINRm−ΔTF;
calculating the power adjustment quantity $P_{offset}$ according to a following formula: $P_{offset}$=SINR−SINRtarget;
and generating the corresponding TPC command according to the calculated power adjustment quantity $P_{offset}$;
wherein, ΔTF is the power margin determined according to the MCS grade of an uplink service of the terminal.

17. The method according to claim 11, wherein,
the step of the base station adjusting current power margin according to the TPC command comprises:
after subtracting the power control character from the current power margin, taking the subtracted power margin as the adjusted power margin.

18. The method according to claim 12, wherein,
the step of the base station adjusting current power margin according to the TPC command comprises:
after subtracting the power control character from the current power margin, taking the subtracted power margin as the adjusted power margin.

19. The system according to claim 9, further comprising:
an uplink service demodulation module and a demodulation signal to interference plus noise ratio measurement module of a physical layer of the base station, and an uplink outer-loop power control module of the MAC layer of the base station, wherein:
the uplink service demodulation module is configured to: receive uplink service data of the terminal, and demodulate and report a cyclic redundancy check indicator corresponding to each transmission block;
the demodulation signal to interference plus noise ratio measurement module is configured to: measure and report an uplink service demodulation signal to interference plus noise ratio of the terminal;
the uplink outer-loop power control module is configured to: according to received configuration parameters sent by the parameter configuration module and the cyclic redundancy check indicator corresponding to each transmission block of the terminal, perform statistics on a block error rate of receiving data of the terminal within a preset time interval, adjust a maintained standard service signal to interference plus noise ratio expected value, and send the adjusted standard service signal to interference plus noise ratio expected value to the uplink inner-loop power control module;
the uplink inner-loop power control module is further configured to: according to the received uplink service demodulation signal to interference plus noise ratio of the terminal reported by the demodulation signal to interference plus noise ratio measurement module, calculate a standard service demodulation signal to interference plus noise ratio, and according to a difference value between the standard service demodulation signal to interference plus noise ratio and the received standard service signal to interference plus noise ratio expected value sent by the uplink outer-loop power control module, calculate a power adjustment quantity and generate a corresponding TPC command to be sent to the terminal; meanwhile, adjust current power margin according to the TPC command, and redetermine the available MCS grade of the terminal according to the adjusted power margin and send the available MCS grade to the terminal.

* * * * *